US008189048B2

(12) United States Patent
Smith

(10) Patent No.: US 8,189,048 B2
(45) Date of Patent: May 29, 2012

(54) VEHICLE SPEED MONITORING SYSTEM

(75) Inventor: Brian David Vincent Smith, Worthing (GB)

(73) Assignee: Pips Technology Limited (GB)

( * ) Notice: Subject to any disclaimer, the term of this patent is extended or adjusted under 35 U.S.C. 154(b) by 980 days.

(21) Appl. No.: 11/911,755

(22) PCT Filed: Apr. 18, 2006

(86) PCT No.: PCT/GB2006/001375
§ 371 (c)(1), (2), (4) Date: Jul. 22, 2008

(87) PCT Pub. No.: WO2006/111715
PCT Pub. Date: Oct. 26, 2006

(65) Prior Publication Data

US 2009/0174777 A1 Jul. 9, 2009

(30) Foreign Application Priority Data

Apr. 18, 2005 (GB) .................................. 0507839.9

(51) Int. Cl.
*H04N 17/18* (2006.01)
*G06K 9/00* (2006.01)

(52) U.S. Cl. ........................................ 348/149; 382/104

(58) Field of Classification Search .................. 348/143, 348/149

See application file for complete search history.

(56) References Cited

U.S. PATENT DOCUMENTS 5,440,313 A 8/1995 Osterdock et al.
5,809,161 A 9/1998 Auty et al.
6,121,898 A 9/2000 Moetteli
6,970,102 B2 * 11/2005 Ciolli ............................ 340/933
7,119,674 B2 10/2006 Sefton (Continued)

FOREIGN PATENT DOCUMENTS

AU 2004231240 12/2004

(Continued)

OTHER PUBLICATIONS

Speed Check Services, How Does SPECS Work, www.speedcheck.co.uk, Jun. 14, 2005.

(Continued)

*Primary Examiner* — Wing Chan
*Assistant Examiner* — David X Yi
(74) *Attorney, Agent, or Firm* — Luedeka Neely Group, P.C.

(57) ABSTRACT

A vehicle speed monitoring system comprises a plurality of cameras (10, 40) for capturing images of vehicle registration marks of passing vehicles. An electronic processing means produces electronic records for each vehicle recognition mark with an associated time of image capture. When a match is found between a vehicle registration mark stemming from a first camera (10) and from a second camera (40) then a central electronic processing means (20) uses the image capture times to calculate a travel time of the vehicle. This time is compared with a minimum travel time for a journey between the first and second cameras. Each camera (10, 40) is provided with clock means individual thereto which produces the times of image capture and each camera is also provided with timing verification means which accesses a plurality of independent time sources. The independent time sources originate time signals independently of the central electronic processing means, and the verification means is capable of checking whether the clock means is generating a time within a predetermined tolerance of the time signals obtained from the independent sources.

15 Claims, 1 Drawing Sheet

U.S. PATENT DOCUMENTS

2007/0069921 A1 3/2007 Sefton

FOREIGN PATENT DOCUMENTS

| | | | |
|---|---|---|---|
| BE | 1014680 | | 3/2004 |
| BE | 1014680 | A6 | 3/2004 |
| DE | 3327706 | | 2/1985 |
| EP | 049815 | | 7/1992 |
| EP | 0494815 | | 7/1992 |
| EP | 0945840 | | 9/1999 |
| EP | 1276086 | | 1/2003 |
| EP | 1513125 | | 3/2005 |
| GB | 2425385 | | 8/2007 |
| JP | 1119898 | | 11/1987 |
| JP | 2001291187 | | 10/2001 |
| KR | 20050011419 | | 1/2005 |
| NL | 1010490 | | 5/1999 |
| WO | 9319441 | | 3/1993 |
| WO | 9824034 | | 6/1998 |
| WO | 0135372 | | 5/2001 |
| WO | 03088179 | | 10/2003 |
| WO | 2004100102 | | 11/2004 |

OTHER PUBLICATIONS

Speed Check Services, Traffic Safety—SPECS Safety Cameras, www.speedcheck.co.uk, Jul. 2000.

Oehmke & Kollegen, Notice to Opposition to European Patent No. EP 1872351B1, Jun. 10, 2009.

Haseltine Lake LLP, Notice of Opposition to European Patent No. EP 1872351B1, Jun. 10, 2009.

Robot Visual Systems GMBH, Traffisection-Speeds Distance-Related Measuring (Traffipax/95/765/11.04/c), Nov. 2004.

NMI Certin B.V., Test Report of Dutch Licensing Authority, Nov. 17, 2006.

NMI Certin B.V., Authorization for Traffisection by Dutch Licensing Authority, Dec. 7, 2004.

Robot Visual Systems GMBH, Invoice for Traffisection Measuring System, Nov. 24, 2004.

Traffipax Traffic Safety Systems, System Specification of Time Stamp Unit of the Traffisection Measuring System, Jan. 2004.

* cited by examiner

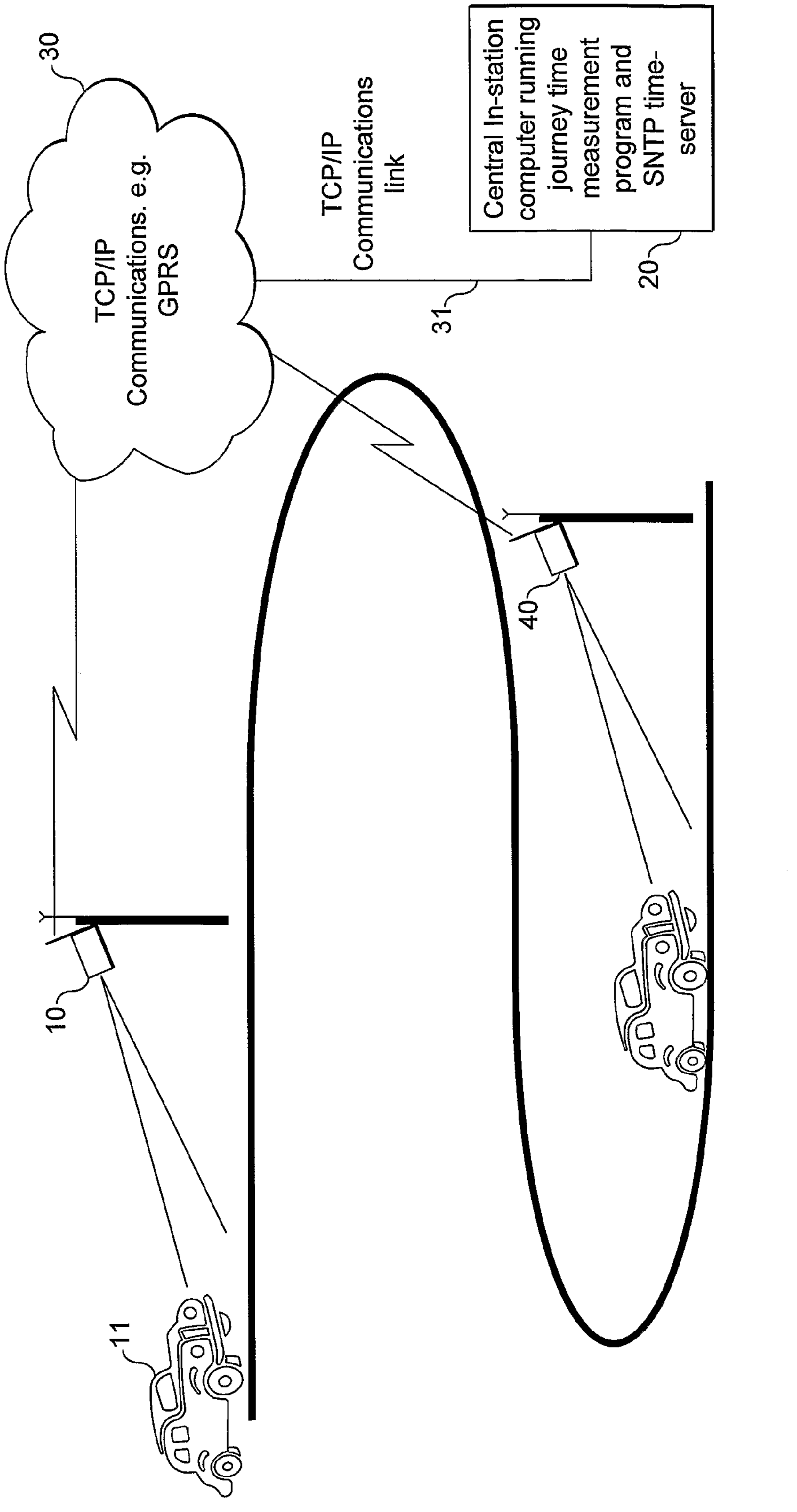
30
TCP/IP Communications. e.g. GPRS
TCP/IP Communications link
Central In-station computer running journey time measurement program and SNTP time-server
20
31
40
10
11

VEHICLE SPEED MONITORING SYSTEM

CROSS REFERENCES TO RELATED APPLICATIONS

This patent application claims priority from and is related to Patent Cooperation Treaty (PCT) Patent Application Serial No. PCT/GB2006/001375 filed 18 Apr. 2006, entitled: "VEHICLE SPEED MONITORING SYSTEM." This patent application also claims priority from and is also related to Great Britain Patent Application Serial No. 0507839.9 filed 18 Apr. 2005, entitled: "VEHICLE SPEED MONITORING SYSTEM." These related Patent Applications are incorporated by reference in their entirety herein.

FIELD

The present invention relates to a vehicle speed monitoring system.

BACKGROUND

It is well known from the prior art to provide speed cameras which instantaneously detect the speed of a vehicle and take a photograph of it and if the vehicle is speeding at the moment when the photograph is taken then a penalty is issued. However, these cameras have the disadvantage that when their location is known then motorists will slow down as they approach the cameras in order to come under the speed limit, but may exceed the speed limit between cameras with no detection possible.

On toll roads it has been proposed in the past that the time taken for a vehicle to travel between tolls can be measured and then an average speed calculated from the time between tolls and the distance between the tolls. If this average speed is above the speed limit then a penalty can be issued. However, this solution requires the construction of tolls and the associated costs related to such tolls and the inconvenience to motorists of having to pass through toll gates.

SUMMARY

The present invention provides in a first aspect a vehicle speed monitoring system comprising:

a plurality of cameras provided one each in a plurality of different geographical locations, each camera capturing images of vehicle registration marks of vehicles passing thereby;

for each camera an electronic processing means, an electronic memory means and data transmission means, the electronic processing means producing electronic records each comprising at least one of the captured images and a time of image capture, which electronic records are stored in the electronic memory means, and the electronic processing means using a character recognition process to extract from at least some of the captured images the vehicle recognition marks appearing therein, which extracted vehicle recognition marks are transmitted onwards by the transmission means in data files which comprise for each vehicle recognition mark an associated time of image capture;

a communications network across which the data files are transmitted; and central electronic processing means in a secure geographical location remote from at least the majority of the cameras, which receives via the communications network from the cameras the transmitted data files and which compares the vehicle registration marks in the data files with each other; wherein when the central electronic processing means determines a match between a vehicle registration mark stemming from a first camera and a vehicle registration mark stemming from a second camera then the central electronic processing means uses the image capture times associated with the matched vehicle identification marks to calculate a travel time of the relevant vehicle between the first and second cameras;

the central electronic processing means compares the determined travel time with a minimum travel time for a journey between the first and second cameras, this minimum travel time being stored in a memory associated with the central electronic processing means; and when the central electronic processing means detects that a determined travel time is less than the minimum travel time then the central electronic processing means produces an evidential record by retrieving from the electronic memory means associated with the first and second cameras the relevant images captured by the first and second cameras and the image capture times recorded therefor; wherein each camera is provided with clock means individual thereto which produces the times of image capture and each camera is also provided with timing verification means which accesses a plurality of independent time sources, which is capable of checking whether the clock means is generating a time which is within a predetermined tolerance of times obtained from the independent sources.

The present invention provides in a second aspect a vehicle speed monitoring system comprising a plurality of cameras provided one each in a plurality of different geographical locations, each camera capturing images of vehicle registration marks of vehicles passing thereby; for each camera an electronic processing means and a data transmission means, the electronic processing means producing electronic records each comprising at least one of the captured images and a time of image capture, which electronic records are transmitted onwards by the transmission means in data files; a communication network across which the data files are transmitted; and central electronic processing means in a secure geographical location remote from at least a majority of the cameras, which receives the transmitted data files and uses character recognition means to extract from the images of the data files the captured vehicle registration marks; wherein the central electronic processing means compares each calculated journey time with a minimum time for the relevant journey as stored in a memory associated with the central processing means; and when the central electronic processing means detects that a determined travel time is less than the minimum travel time then the central electronic processing means produces an evidential record comprising the relevant images captured by the first and second cameras and the image capture times associated therewith; wherein each camera is provided with clock means individual thereto which produces the times of image capture and each camera is also provided with timing verification means which accesses a plurality of independent time sources, which checks whether the clock means is generating a time which is within a predetermined tolerance of times obtained from the independent sources.

By the present invention a network of cameras can be established which record images of all the vehicles passing by them. From these images the vehicle registration marks on the vehicles can be determined. When a vehicle passes two cameras then the central processor will determine from the captured images the journey time of the vehicle between the two cameras and will know from stored information whether this journey time indicates that the vehicle has been travelling at legal speeds or at illegal speeds. In the latter case, a violation report can be prepared and issued and the motorist fined.

DETAILED DESCRIPTION

A preferred embodiment of the present invention will now be described with reference to the accompanying drawing which is a schematic illustration of the vehicle speed monitoring system according to the present invention.

In the drawing there can be seen a first camera 10 situated in a first geographical location. This camera 10 captures images of vehicles passing thereby, including the vehicle 11 shown schematically in the drawing. The camera 10 has associated with it electronic processing apparatus. The electronic processing apparatus will include a camera clock specific to the camera 10 which generates time signals. Each of the captured images produced by the camera 10 is time-stamped with the time signal generated by the camera clock.

In order to ensure accuracy in the timing, the electronic processing apparatus is supplied with two independent time sources against which it checks the generated time produced by the camera clock. By providing the camera with two independent systems for time synchronisation, which are themselves traceable to time standards, the system of the current invention ensures that all of the roadside cameras in the network of cameras are synchronised with identical times generated by camera clocks and that there is a guaranteed maximum error, typically 100-200 milliseconds. This is important for the integrity of the system as a whole, which will not work if the camera clocks become substantially misaligned. The time-lock of the camera clock to both time sources is periodically monitored and the times compared with each other and the differences between compared with a maximum difference threshold (e.g. 100-200 milliseconds). If lock with either time-secure is lost and the difference exceeds the maximum difference threshold then all the subsequent time-stamps are marked invalid until the situation is restored to accuracy. Thus, all of the time-stamped images and vehicle registration mark reading events are timed with an accuracy sufficient for evidential purposes.

Currently available independent time resources traceable to international standards include the Global Positioning System (GPS) Time Standard, the Broadcast Time Standard provided by the National Physics Laboratory in Rugby and the widely-available Atomic Time Standard. The electronic processing apparatus associated with the camera 10 obtains the time sources either from a wired connection (e.g. to a TCP/IP network) and/or via a radio receiver associated with the camera which receives and decodes time source signals broadcast as electromagnetic waves, e.g radio waves. Two independent sources are used to ensure traceable time verification.

The electronic processing means associated with camera 10 checks the time produced by the camera clock against the time obtained from both independent time sources. The camera clock time is adjusted if necessary. If at any time the difference between the camera clock time and the times of the two independent sources varies by more than a predefined maximum then verification software running on the electronic processing apparatus produces a record to show that the recorded time is invalid and this is stored along with captured images from the relevant time period so that they are noted as invalid.

As mentioned above, each captured image is time-stamped with the time produced by the camera clock and also a record of the validity of the camera clock time at the time of image capture. The software running on the electronic processing apparatus will also identify from the captured images vehicle registration marks, which are again associated with the time of the image from which they were extracted. This process is a character recognition process and is well-documented in the prior art. Any invalid status entries which are recorded against time-stamps on captured images are also recorded against the relevant extracted vehicle registration marks related to those images.

The extracted vehicle registration marks are gathered by the electronic processing apparatus into batches for particular time periods, e.g. time periods of 5 minutes. In the electronic records produced the electronic processing apparatus each vehicle registration mark is associated with a locally produced sequence number, the sequence number being guaranteed to be unique across the network of cameras of the system over a large time period, typically years. The time-stamped vehicle registration mark are sent as data files (either one by one or in batches) to a central computer 20. In the illustrated example the records of time-stamped vehicle registration marks are transmitted by a general packet radio service (GPRS) system, e.g. over a GSM network, to a receiver 30 where they are decoded and then sent along an electronic link 31 to the central computer 20. The GPRS system is a robust communications medium with full error handling. As an alternative, the vehicle registration mark records could be sent along a wired Internet connection to the central computer 20, this communications medium also being a robust medium with full error handling.

The electronic processing means associated with the camera 10 has a memory for storing evidential records of information electronically. Each evidential record of information will include an image of the vehicle registration mark (e.g. license plate) itself and also an overview image of the vehicle on which the vehicle registration mark (e.g. license plate) appears. Other images of the vehicle could also be incorporated in the evidential record, e.g. multiple images spaced by small time intervals to show the direction of travel of a vehicle. Each evidential record will also include the sequence number allocated to the relevant vehicle registration mark as determined by the character recognition system, so that each evidential record can be correlated with the relevant vehicle registration mark. To prevent tampering with the recorded evidential records the electronic processing system associated with the camera 10 has an authentication function which adds to the evidential record either a "message digest" or "long check sum" such as produced by the SHA-1 algorithm. When the evidential records are later retrieved and used then the record "message digest" or "long check sum" can be checked for its accuracy and thereby the authenticity of the evidential report confirmed.

As an additional security measure the evidential records are encrypted by encryption software running on the electronic processing apparatus associated with the camera 10. Typically, an algorithm such as AES with a long 256 bit-key would be used to provide the maximum protection currently available, although more sophisticated algorithms would be used as they are developed. Typically, the encryption used will be dependent on an electronic key exchange protocol between the central computer 30 and the roadside camera 10 for maximum security, e.g. the Diffie Hellman Key Exchange protocol. The encryption can be set up so that the key in the camera is destroyed in tampering, e.g. loss of power.

The images in the evidential records are stored in a non-volatile memory, typically a flash type semiconductor memory operating under a conventional file system to provide for later retrieval. Each evidential record will be allocated a file name which includes the sequence number, the vehicle registration mark and also the read-confidence of the read plate, i.e. whether the time produced by the camera clock during the period of image capture was within the accepted tolerances of the independent time sources. This allows as a further check, but is not strictly necessary since the vehicle registration marks sent to the control computer 30 (as described later) will each be marked valid or invalid and only evidential records for valid time entries will be retrieved for further processing. However, the possibility of a double check is preferred.

The FIGURE shows a second camera 40 which will be identical to the first camera 10, but is located in a geographical location remote from the geographical location of the camera 10. In exactly the same way as the camera 10, the camera 40 will capture images of passing vehicles and will process the recorded images along with time stamps, verified as described above. The camera clock of the camera 40 is synchronised to the same independent time sources. In the FIGURE the camera 40 captures an image of the same vehicle 11 as it passes by the camera.

In the FIGURE only two cameras are shown, but it is envisaged that the network will comprise a much larger number of cameras, each identical to the camera 10 and each remotely located from each other. Each of the cameras will transmit data files comprising vehicle recognition marks via the GPRS system to a receiver 30 which will then pass the information to the central computer 20 via a TCP/IP communications link 31.

The central computer 30 gathers all of the time-stamped vehicle registration mark data files issued by all the cameras and then runs a matching algorithm looking for matching vehicle registration marks provided by different cameras over a defined time period. Once the central computer 20 determines that there is a match between vehicle registration marks provided by two different cameras then the computer will retrieve from one of its databases a record of a minimum time associated with travel between the two relevant cameras (this minimum time typically being calculated as the time taken to travel between the two cameras if the maximum legal speed limit is adhered to throughout the journey, although the minimum time could be longer than this). The database of the central computer 20 will keep a record of minimum times for each combination of cameras within the network.

From the time stamps associated with the vehicle registration data files, the central computer 20 can determine an actual travel time between the cameras and can then compare this actual travel time with the minimum travel time extracted from the database. If the actual travel time is less than the minimum travel time then the central computer 20 concludes that the vehicle must have exceeded the speed limit in travelling between the two cameras. The central computer 20 will compute a vehicle speed for the relevant journey.

Once a violation of the maximum speed limit is detected by the central computer 20 then the computer 20 retrieves from the memory stores of the relevant cameras the evidential records associated with the relevant time-stamped vehicle recognition mark data files it has received. The encrypted files stored at the relevant cameras are sent over the communications network from the cameras to the central computer 20, which upon receipt of the files uses deciphering means to convert the encrypted transmitted records back to their unencrypted form and will then use an authentication algorithm to authenticate the transmitted files from the authentication information included in them.

The central computer 20 will produce a violation record comprising the relevant captured images, the timings associated with the captured images, the calculated journey time and the calculated journey speed. This can be used to produce a violation report, this being a printable document containing all of the images and the associated information for the violation as decrypted from the relevant evidential records. Assuming that the plate read confidences of all of the captive images are above a predetermined threshold, enquiries are made by the central computer to a database to determine the name and address of the registered owner of the relevant vehicle and then a violation report is sent to the relevant person. Alternatively, a violation report can be produced for checking by human operator and manual processing before despatch.

Whilst above the system operates by storing locally at each camera evidential records comprising captured images, timestamps etc and then these evidential records are called for only when the central computer 20 matches vehicle registration marks as sent by the cameras, in a less preferred alternative the evidential records could all be sent by the cameras to the central computer 20 for storing by the central computer 20 and the central computer 20 could run the character recognition software necessary to determine the vehicle registration marks from the captured images. In other words, no local processing at cameras would be carried out to determine vehicle registration marks and instead the processing at the local cameras would merely collect together evidential records and send them on without any character recognition first. This alternative has the disadvantage that there is greatly more information transmitted by the communications network and a lot more information has to be held centrally at the central computer 20. However, the alternative system does have the advantage of less complexity of processing at each of the distributed cameras and additional security in that all stored data can be held in a very secure environment (although the use of authentication and encryption algorithms, as described above, does make roadside data storage sufficiently secure).

The invention claimed is:

1. A vehicle speed monitoring system comprising:

a plurality of cameras disposed at least one each in a plurality of different geographical locations, each camera capturing images of vehicle registration marks of vehicles passing thereby;

each camera comprising means for producing electronic records, means for storing the electronic records and means for transmitting the electronic records, the electronic records each comprising at least one of the captured images and a time of image capture, which electronic records are stored in the means for storing electronic records, wherein the means for producing electronic records use a character recognition process to extract from at least some of the captured images the vehicle registration marks appearing therein, which extracted vehicle registration marks are transmitted onwards by the means for transmitting the electronic records in data files which include an associated time of image capture for each vehicle registration mark;

a communications network across which the data files are transmitted; and a central computer disposed in a geographical location remote from at least the majority of the cameras, the central computer configured to receive the transmitted data files via the communications network from the cameras and compare the vehicle registration marks in the data files with each other; wherein when the central computer determines a match between a vehicle registration mark in an image captured by a first camera and a vehicle registration mark in an image captured by a second camera, the central computer uses the retrieved times of image capture associated with the matched vehicle registration marks to calculate a travel time of the relevant vehicle between the first and second cameras; wherein the central computer compares the determined travel time with a minimum travel time for a journey between the first and second cameras, this minimum travel time being stored in a memory associated with the central computer; and when the central computer detects that a determined travel time is less than the minimum travel time, the central electronic processing means produces an evidential record by retrieving the relevant images captured by the first and second cameras and the image capture times recorded therefor from the means for storing electronic records associated with the first and second cameras;

wherein each camera includes:

a camera clock which produces the time of image capture for each image; and means for timing verification which accesses an independent time value from each of at least two independent time sources and checks whether a difference between the time of image capture generated by the camera clock and each of the independent time values is less than a maximum difference threshold.

2. A vehicle speed monitoring system as claimed in claim 1 wherein the means for timing verification produces an invalid record if the difference between the time of image capture generated by the camera clock and at least one of the independent time values is not less than a maximum difference threshold, said invalid record being associated with one or more relevant vehicle registration marks in the data files produced by the means for producing electronic records associated with the camera, and the central computer only producing an evidential record of captured images with validated times of capture.

3. A vehicle speed monitoring system as claimed in claim 1 wherein the independent time sources originate time signals independently of the central computer.

4. A vehicle speed monitoring system as claimed in claim 1 wherein the means for timing verification comprises a receiver which receives and decodes a broadcast electronic time source signal.

5. A vehicle speed monitoring system as claimed in claim 1 wherein the means for timing verification comprises a connection to a TCP/IP network over which an electronic time source signal is transmitted.

6. A vehicle speed monitoring system as claimed in claim 1 wherein the means for transmitting the electronic records of each camera transmits the data files and, on request, sends electronic records as electromagnetic signals to a receiver connected to the central computer.

7. A vehicle speed monitoring system as claimed in claim 1 wherein the electronic records each comprise a first captured detailed image focused on the vehicle registration mark and at least a second captured overview image showing the vehicle on which the vehicle registration mark appears.

8. A vehicle speed monitoring system as claimed in claim 1 wherein the means for producing electronic records associated with each camera comprise means for local authentication which generate an authentication code for inclusion in each electronic record, which authentication code is checked by means for central authentication provided in the central computer to ensure that the transmitted record has not been tampered with prior to or during transmission.

9. A vehicle speed monitoring system as claimed in claim 1 wherein the means for producing electronic records associated with each camera comprises means for encrypting each electronic record prior to transmission and the central computer comprises means for converting each encrypted transmitted record back to an unencrypted form.

10. A vehicle speed monitoring system as claimed in claim 1 wherein the central computer includes means for generating a violation report, and for each evidential record produced the means for generating a violation report retrieves from a database a name and address of the owner of the relevant vehicle and produces a violation report containing at least the relevant captured images, the capture times and the name and address of the vehicle owner.

11. A vehicle speed monitoring system comprising:

a plurality of cameras disposed at least one each in a plurality of different geographical locations, each camera capturing images of vehicle registration marks of vehicles passing thereby;

each camera comprising means for producing electronic records and means for transmitting the electronic records, the electronic records each comprising at least one of the captured images and a time of image capture, which electronic records are transmitted onwards in data files by the means for transmitting the electronic records, wherein the means for producing electronic records use a character recognition process to extract from at least some of the captured images the vehicle registration marks appearing therein, which extracted vehicle registration marks are included in the data files comprising for each vehicle registration mark an associated time of image capture transmitted onwards by the means for transmitting the electronic records;

a communication network across which the data files are transmitted; and a central computer disposed in a secure geographical location remote from at least a majority of the cameras, the central computer configured to receive the transmitted data files and use means for character recognition to extract the captured vehicle registration marks from the images of the data files; wherein the central computer compares the extracted vehicle registration marks to determine a match between vehicle recognition marks in images captured from different cameras;

when the central computer determines a match, the central computer uses the image capture times associated with the matched vehicle registration marks to determine a journey time of the relevant vehicle between the relevant cameras; wherein the central computer compares each calculated journey time with a minimum time for the relevant journey as stored in a memory associated with the central computer;

when the central computer detects that a determined travel time is less than the minimum travel time, the central computer produces an evidential record comprising the relevant images captured by the first and second cameras and the image capture times associated therewith; and wherein each camera includes a camera clock which produces the time of image capture for each image, and each camera also includes means for timing verification which accesses an independent time value from each of at least two independent time sources, and checks whether a difference between the time of image capture generated by the camera clock and each of the independent time values is less than a maximum difference threshold.

12. A vehicle speed monitoring system as claimed in claim 11 wherein the means for timing verification produces an invalid record if the time generated by the means for generating time signals is outside the predetermined tolerance, said invalid record being associated with one or more relevant vehicle registration marks in the data files produced by the means for producing electronic records associated with the camera, and the central computer producing an evidential record only of captured images with validated times of capture.

13. A vehicle speed monitoring system as claimed in claim 11 wherein the independent time sources originate time signals independently of the central computer.

14. A vehicle speed monitoring system comprising:

a plurality of cameras disposed at least one each in a plurality of different geographical locations, each camera capturing images of vehicle registration marks of vehicles passing thereby;

each camera comprising means for producing electronic records, means for storing the electronic records and means for transmitting the electronic records, the electronic records each comprising at least one of the captured images and a time of image capture, which electronic records are stored in the means for storing the electronic records, wherein the means for producing electronic records uses a character recognition process to extract from at least some of the captured images the vehicle recognition marks appearing therein, which extracted vehicle recognition marks are transmitted onwards by the means for transmitting the electronic records in data files which include an associated time of image capture for each vehicle recognition mark;

a communications network across which the data files are transmitted; and a central computer in a geographical location remote from at least the majority of the cameras, the central computer configured to receive the transmitted data files via the communications network from the cameras and compare the vehicle registration marks in the data files with each other; wherein when the central computer determines a match between a vehicle registration mark in an image captured by a first camera and a vehicle registration mark in an image captured by a second camera, the central computer uses the retrieved image capture times associated with the matched vehicle registration marks to calculate a travel time of the relevant vehicle between the first and second cameras; wherein the central computer compares the determined travel time with a minimum travel time for a journey between the first and second cameras, this minimum travel time being stored in a memory associated with the central computer; and when the central computer detects that a determined travel time is less than the minimum travel time, the central computer produces an evidential record by retrieving from the means for storing the electronic records associated with the first and second cameras the relevant images captured by the first and second cameras and the image capture times recorded therefor;

wherein each camera is provided with a camera clock which produces the time of image capture for each image, and each camera also includes means for timing verification which accesses an independent time value from each of at least two independent time sources that originate time signals independently of the central computer, checks whether a difference between the time of image capture generated by the camera clock and each of the independent time values is less than a maximum difference threshold; and wherein the means for timing verification comprises a receiver which receives and decodes a broadcast electronic time source signal;

wherein the means for timing verification comprises a connection to a TCP/IP network over which an electronic time source signal is transmitted.

15. A vehicle speed monitoring system comprising:

a plurality of cameras disposed at least one each in a plurality of different geographical locations, each camera capturing images of vehicle registration marks of vehicles passing thereby;

each camera comprising an electronic processing apparatus, memory and data transmission link, the electronic processing apparatus configured to produce electronic records each comprising at least one of the captured images and a time of image capture, which electronic records are stored in the memory, and the electronic processing apparatus using a character recognition process to extract from at least some of the captured images the vehicle registration marks appearing therein, which extracted vehicle registration marks are transmitted onwards by the data transmission link in data files which include an associated time of image capture for each vehicle registration mark;

a communications network across which the data files are transmitted; and a central electronic processing apparatus in a geographical location remote from at least the majority of the cameras, which receives the transmitted data files via the communications network from the cameras and which compares the vehicle registration marks in the data files with each other; wherein when the central electronic processing apparatus determines a match between a vehicle registration mark in an image captured by a first camera and a vehicle registration mark in an image captured by a second camera, the central electronic processing apparatus uses the retrieved image capture times associated with the matched vehicle registration marks to calculate a travel time of the relevant vehicle between the first and second cameras; wherein the central electronic processing apparatus compares the determined travel time with a minimum travel time for a journey between the first and second cameras, the minimum travel time being stored in a memory associated with the central electronic processing apparatus; and when the central electronic processing apparatus detects that a determined travel time is less than the minimum travel time, the central electronic processing apparatus produces an evidential record by retrieving from the memory associated with the first and second cameras the relevant images captured by the first and second cameras and the image capture times recorded therefor;

wherein each camera includes a camera clock which produces the time of image capture for each image and each camera includes means for timing verification which is operable to accesses an independent time value from each of at least two independent time sources and to check whether a difference between the time of image capture generated by the camera clock and each of the independent time values is less than a maximum difference threshold.

* * * * *